United States Patent [19]

Shomler

[11] Patent Number: 5,623,599
[45] Date of Patent: Apr. 22, 1997

[54] METHOD AND APPARATUS FOR PROCESSING A SYNCHRONIZING MARKER FOR AN ASYNCHRONOUS REMOTE DATA COPY

[75] Inventor: Robert W. Shomler, Morgan Hill, Calif.

[73] Assignee: International Business Machines Corporation, Armonk, N.Y.

[21] Appl. No.: 282,944

[22] Filed: Jul. 29, 1994

Related U.S. Application Data

[63] Continuation-in-part of Ser. No. 36,017, Oct. 12, 1994, Pat. No. 5,446,871.

[51] Int. Cl.$^6$ .................................................. G06F 11/34
[52] U.S. Cl. ............................................... 395/182.16
[58] Field of Search .......................... 395/575, 182.16; 371/20.1, 25.1, 32, 33, 67.1, 68.2, 71, 61.1, 62; 370/85.4; 341/176

[56] References Cited

U.S. PATENT DOCUMENTS 4,625,081  11/1986  Lotito et al. ........................ 379/88

Primary Examiner—Robert W. Beausoliel, Jr.
Assistant Examiner—Phung M. Chung
Attorney, Agent, or Firm—Benman Collins & Sawyer; Bruce Brodie

[57] ABSTRACT

The present invention relates to event synchronization in asynchronous remote data duplexing, the synchronization being non-disruptive to application execution at a host device and to data copying at a remote site. The event sequence is characterized by embedding labeled tokens of write operations including addresses and periodic checkpoint lists there establishing a total ordering. Event synchronization is achieved by embedding at the host a synchronization request having a higher sequence number than that of some prior predetermined event and generating a responsive synchronization reply from the remote site to the host. The present invention finds use in the communication and remote duplex recording of financial events such as the rare event transfer of large monetary sums in a population of transfers of small sums.

29 Claims, 7 Drawing Sheets

| WRITE TOKEN | UPDATED DATA |
|---|---|
| 121 D. BLKN. CT | |
| 122      "" | DATA BEING MARKED |
|          "" | |
|          "" | |
|          "" | |
| 126      "" | ← MARKER TOKEN |
| 127 D. BLKN. CT | |
| | |
| | |
| | |
| 131      "" | |
| 132      "" | |
| | |
| | |
| 135      "" | |
| | |
| | |
| 138 D. BLKN. CT | |
| NR    ??... | |

A → (points to 126/127)

FIG. 6

METHOD AND APPARATUS FOR PROCESSING A SYNCHRONIZING MARKER FOR AN ASYNCHRONOUS REMOTE DATA COPY

This application is a continuation in part of Ser. No. 08/036,017 filed on Oct. 12, 1994 now U.S. Pat. No. 5,446,871.

BACKGROUND OF THE INVENTION

1. Field of the Invention

The present invention relates to data preservation in an information handling system by asynchronous remote data duplexing (also termed remote data copying) and more particularly, to the real-time continuous copying of data at a remote location from copies based at a primary site storage subsystem.

2. Description of the Related Art

Data copying is one form of data preservation in an information handling or computer system. However, data preservation via data copying must take many factors into account. This is of special significance where it is anticipated that data copied and stored at a remote site would be the repository for any continued interaction with the data should the work and data of a primary site become unavailable. The factors of interest in copying include the protection domain (system and/or environmental failure or device and/or media failure), data loss (no loss/partial loss), time where copying occurs as related to the occurrence of other data and processes (point in time/real time), the degree of disruption to applications executing on said computer, and whether the copy is application or storage system based. With regard to the last factor, application based copying involves log files, data files, and program routines while storage based copying involves an understanding of direct access storage device (DASD) addresses with no knowledge of data types or application use of the data.

Real-time remote data duplexing systems require some means to ensure update sequence integrity as write updates to the secondary or remote DASD data copy. One way to accomplish this is to provide a synchronous system to control the DASD subsystems. In such a system, the primary DASD write operation does not complete until a copy of that data has been confirmed at a secondary location. The problem with such synchronous systems is that they slow down the overall operation of the duplexing system.

Asynchronous copy systems accomplish sequence integrity through communications between primary and secondary DASD subsystems. In such systems, a system at the primary site can determine the sequence among different update write operations among all DASD subsystems at the primary site and communicate that information to the DASD subsystem at the remote site. The secondary subsystem in turn uses the sequence information from the primary to control the application of update data to the secondary DASD data copy. Known asynchronous copy systems are described below.

McIlvain and Shomler, U.S. patent application No. 08/036,017 entitled "Method and Means for Multi-System Remote Data Duplexing and Recovery" describes the use of a store and forward message interface at the DASD storage management level between a source of update copies and a remote site in a host to host coupling in which the difference in update completeness or loss of the sequence of write updates could be completely specified in the event of interruption.

Cheffetz, et al., U.S. Pat. No. 5,133,065 entitled "Backup Computer Program for Networks" issued Jul. 21, 1992, discloses a local area network (LAN) having a file server to which each local node creates and transmits a list of local files to be backed-up. Such remote generation reduces the traffic where a network server initiates the list creation and file copying activity. Arguably, art published before this reference taught centrally administered file selection. This resulted in compromises to local node security and overuse of the server. This is presumptively avoided by Cheffetz's local node generated lists and remission of the lists to the file server.

Beale, et al., U.S. Pat. No. 5,155,845 entitled "Data Storage System for Providing Redundant Copies of Data on Different Disk Drives", dual copies variable length records (CKD) on two or more external stores by causing a write to be processed by the first storage controller and be communicated in parallel over a direct link (broad band path) to the second storage controller obviating the path length limitation between the primary and remote copy sites. Such a limitation is occasioned by the fact that CKD demand/response architecture is length limited to in the range of 150 meters.

Another example of an asynchronous system is disclosed in U.S. patent application No. 07/992,219, entitled "Remote Data Duplexing Asynchronous Information Packet Message", by Micka et. al. Disclosed is a system for asynchronously duplexing direct access storage device (DASD) data in a plurality of DASD subsystems has the advantage of decoupling the data duplexing operation from the DASD write I/O operation. This ensures the write does not incur unnecessary wait states in the subsystem. By establishing a sequence checkpoint at which time a set of information packets are grouped together and processed as a single sequence unit, this decoupling and independent operation takes place. Through this independence, data copying to a secondary location can take place without affecting the performance of the subsystems and also without affecting the corresponding integrity of the data that is being updated.

In an asynchronous remote dual copy, the work of the application continues while the data required for recovery of that application is being sent to the remote copy location. If the primary system location is taken out of service, requiring that applications be resumed at the remote location using data copied there, the most recent data from the primary is likely to have been enroute or to have not been received at the remote location. When the application is a data base process, recovery operations at the remote site analyze the data present and adjust transaction records so as to discard partial, incomplete transactions.

Some transactions that had been completed at the primary site thus will not appear to have been completed (or even started) when the data base process resumes operations at the secondary. In effect, these transactions are 'lost'. This is inherent in an asynchronous copy scheme and is an accepted mode of operation, since ensuring that every element of transaction data was secured at a remote copy site before actually completing a transaction imposes an unacceptably high performance burden.

Certain transactions are, however, viewed as sufficiently valuable and important to the user of a system that said user wishes to take extraordinary measures to insure that essential transaction related data are secured at the remote site before completing the transaction; i.e., before committing the transaction outside the system or enterprise.

Synchronizing on a particular transaction requires, for data base consistency, that all data preceding the transaction's data also be secured—written at the remote site in its proper update sequence. Forcing the copy system into a synchronous mode of operation—holding up the flow of transactions while the data was secured at the remote location and acknowledged back to the primary, would be very disruptive to ongoing work.

What is needed, therefore, is an asynchronous copy system in which transactions are secured at a remote site without interrupting the flow of other transactions in the system. Such a system should be simple to implement, efficient and non-disruptive to existing asynchronous copy systems.

The present invention addresses such a need.

SUMMARY OF THE INVENTION

The present invention provides a system by which a transaction process can request the remote copy service to communicate when specific data, and all data preceding it, have been secured at the remote copy site, without requiring suspension and delay in the sending of other updated data to the remote copy site.

A method and system for assuring the occurrence of an event at a site remote from a source of asynchronous sequence of write operations, the sequence of write operations including a sequential number of tokens that provide an ordered event sequence, is provided. The method and system comprises providing in the sequence at the source a marker request with a sequential number exceeding in magnitude a previous predetermined event, transmitting the sequence with the marker request to the remote site, and sending a reply from the remote site to the source after the marker request is received at the remote site.

While numerous instances can be found of token use in communication streams to initiate synchronization of events, paths, or states in such configurations as rings, loops or the like, such methods do not teach or suggest the non-disruptive preservation of attributes in communicated event streams which enable reliable recording at a remote site of an information history. In this regard, asynchronously and independently executing applications and processors create a stream of write operations against local storage and remote sites, which stream is both enqueued and executed at different rates resulting in a near random ordered copy sequence.

BRIEF DESCRIPTION OF THE DRAWINGS

FIG. 6 is an illustration of the pending write queue utilizing the synchronizing marker in accordance with the present invention.

DESCRIPTION OF THE INVENTION

Figure 1:
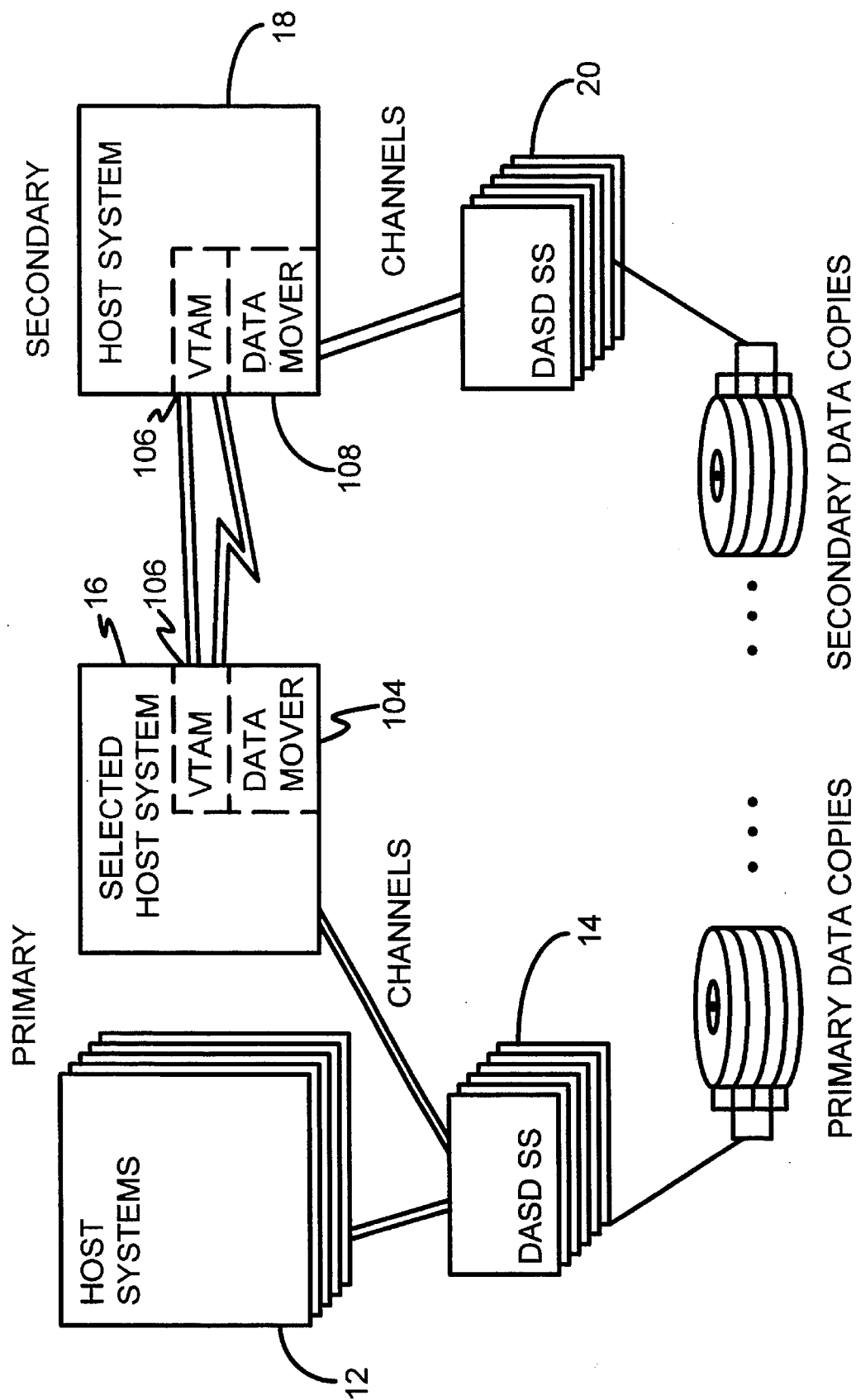
FIGS. 1 and 2 are diagrams of a conventional remote data duplexing system.

The present invention relates to an improvement in asynchronous remote data copying. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To perform asynchronous remote copying there are three requisites:
1. The sequence of data updates must be determinable at a local site.
2. That sequence must be communicable by the local site to a remote site.
3. The remote site must be able to use the sequence to control the updating at the remote site.

In a conventional system, host system software notifies DASD subsystems that data duplexing of certain extents (sets of tracks and cylinders) are to be performed. DASD subsystems then monitor those extents for write activity, and notify a sequencing program service in the host system that a write operation is in progress by providing a DASD-information packet that describes the DASD track(s) and record(s) that are being written as well as a subsystem generated sequence number for the update.

The sequencing program combines the DASD provided information packet with a time stamp of that write operation relative to all other write time stamps that are being duplexed within the cooperating set of systems. The subsystem will signal "operation complete" to the host that initiated the I/O write operation. The information packet is also sent to the secondary location via asynchronous message to provide advance information that the identified DASD will be updated.

Subsequently, a data mover program, having been given the information packet, retrieves the updated data from the subsystem and causes it to be sent, together with information packet, to the secondary location. The secondary system queues the DASD update data as it is received; then it schedules I/O operations to update its shadow (duplex) data copies in the same sequence as they appeared at the primary systems. In the event of disaster at the primary location, a recovery process at the secondary data location can interpret the sequenced information packets and data updates received at the secondary to present a consistent-in-time image of that data as it was on the primary system(s) DASD.

The data copy consistency objective is for the recovery process to be able to provide an image of DASD data at the recovery location that is equivalent to the data that would have been on DASD at the primary location had the primary system complex suffered a complete and total outage but with no equipment destruction. Following execution of the recovery process at the remote location, the secondary data should appear to applications exactly as it would have some short time earlier at the primary. The amount of time "earlier" is a 'window of data loss' that customers may influence by system design parameters such as distance of recovery site from primary, bandwidth of transfer available between the primary and recovery site, and processing power available for the data mover.

An essential component of such a system is that the same sequence of primary DASD subsystems be provided at the secondary location. The sequence order is achieved via a global event sequence log. The global event sequence log entries are created and sequenced as a result of the DASD subsystem initiated communication to the global sequencer for each data write operation.

This type of system imposes the burden of DASD subsystem communication sequence to the global sequencer for each update synchronous with the particular host data update operation. In such a system the DASD subsystem sends an explicit information packet to the sequencer program for each write operation to be executed.

To ensure accurate sequencing, the registration process must be synchronous with the operation being registered, that is the write operation cannot be completed by a control unit until the information packet has been accepted by the sequencer. To more specifically describe this conventional system refer now to FIGS. 1 and 2.

Consider a primary site consisting of one or more host systems 12 that share access to some number of DASD subsystems 14 (FIG. 1). For the purpose of this description, one of these systems 12 will be designated the "selected primary system." In this selected system 12 are two functional programs: one labeled data mover 104, the second is Virtual Telecommunications Access Method (VTAM) 106 or other communications manager with capability for inter-system communications over high bandwidth links. VTAM 106 will be used to refer to this communications program function.

The data mover 104 function consists of two parts: a serializer and a data mover. The serializer receives a write sequence information packet for every write operation on all DASD subsystems 14 in the primary that has been selected for duplexing (maintaining a shadow copy at the secondary), and puts these information packets into messages for VTAM 106 to send to a receiving system at the secondary location. The data mover retrieves changed data—records written to the primary DASD subsystem 14—and forms them and their information packets into messages for VTAM 106 to send to the secondary.

VTAM 106 programs in the primary and secondary systems transport messages between the primary and secondary. These messages communicate the establishment of shadowed (duplexed) data extents, information packets that indicate updates in progress, and information packets with changed data to be applied to the secondary data copies. The VTAM 106 programs operate on high bandwidth communication networks of one or more connections between the primary and secondary system. T1 lines, T3 lines, or other telecommunications services may be employed to support distances greater than ESCON or other direct channel to channel connections can support. The secondary may be any distance from the primary.

The secondary system has a data mover 108 functional program in addition to its above-described VTAM 106 service. The secondary data mover 108 receives the VTAM 106 messages sent by the primary, extracts and maintains the sequencing information packets, and applies updated data to copies of the DASD subsystem 20 at the secondary site.

Figure 2:
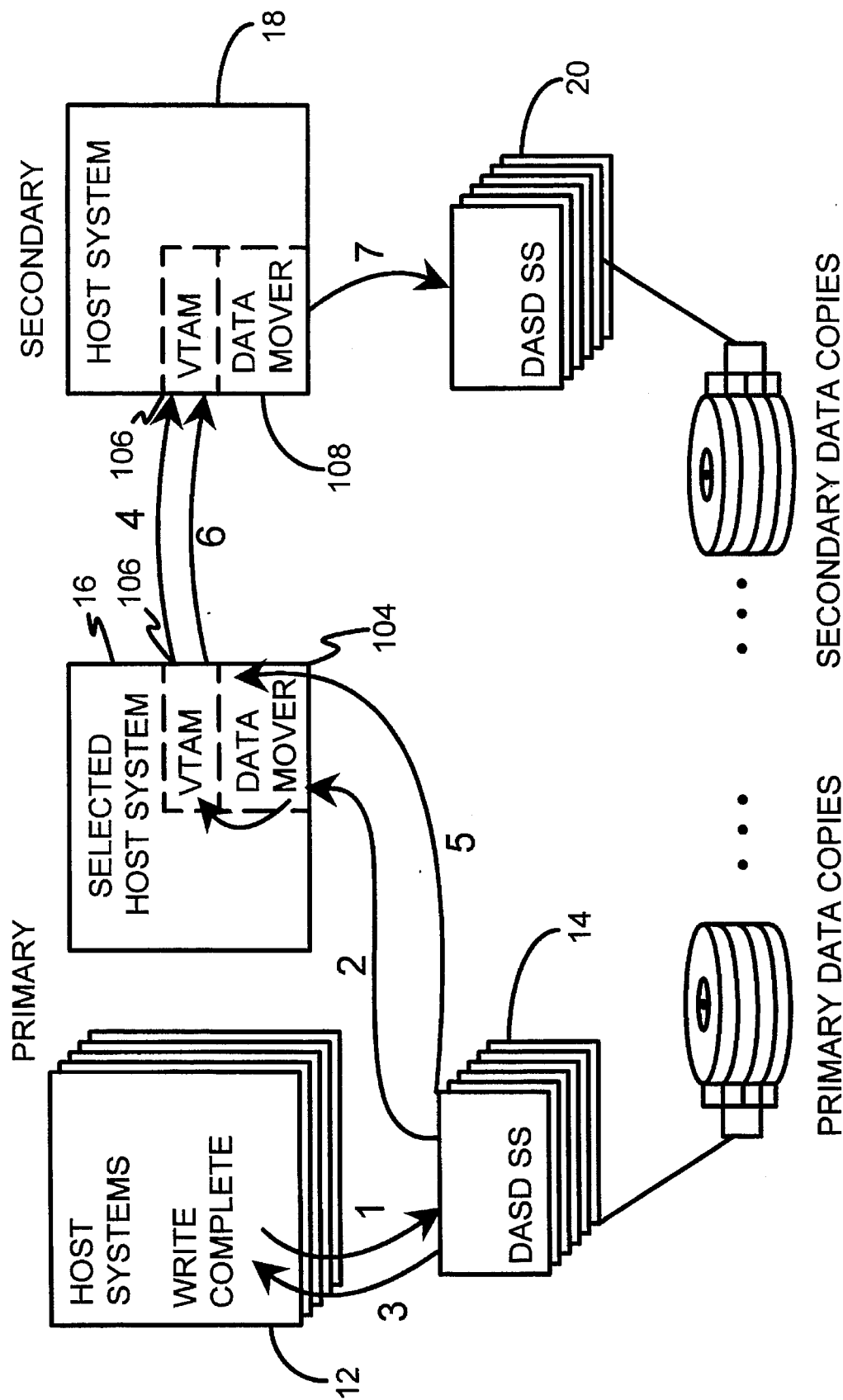

Duplexing operation is established for the selected DASD subsystem 16, volumes or extents, by the primary system similar to the method for establishing a Concurrent Copy session. The primary data mover if needed, may establish an initial secondary copy of the duplexed data. Once the duplexing session has been initiated, the DASD subsystems 14 will monitor those extents for data writes and take the following action when a write operation is begun (FIG. 2).

Figure 3:
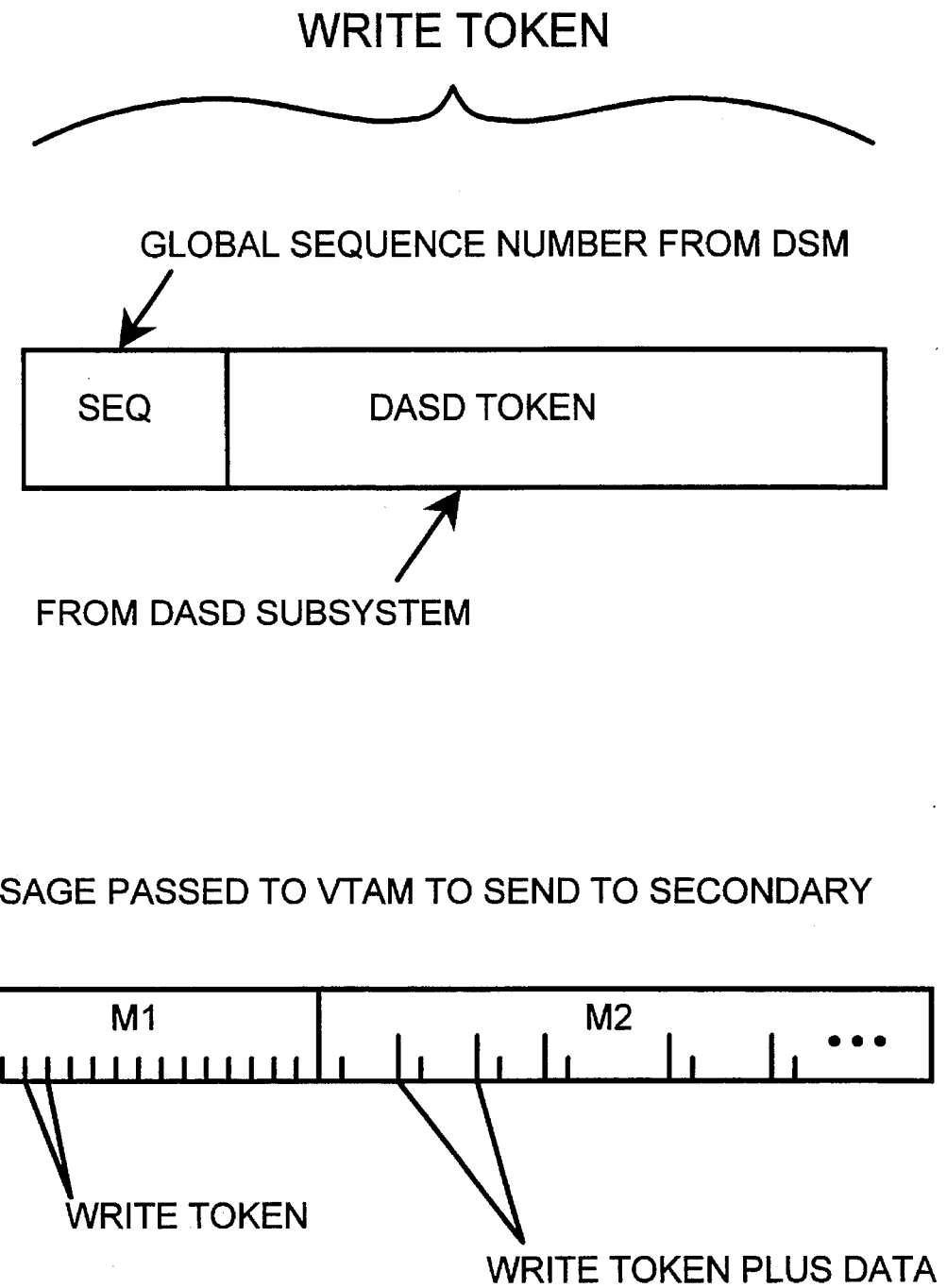
FIG. 3 is a diagram of information packet messages.

A Channel Command Word (CCW) that initiates a data write sequence to a duplexed DASD address is processed by a primary DASD subsystem 14 (this may be the first of several CCWs for that sequence, as for an ECKD Locate Record CCW); data moves from the writing system 12 to the primary DASD subsystem 14 (1). The primary DASD subsystem 14 sends a write information packet (2) to the data mover 104 serializer program (which may be or may not be on the same system that is writing the data to DASD subsystem 14). The request information packet identifies the duplex session, device, track(s) and record(s) to be written. The data mover 104 serializer adds the information packet to the next message that will be passed to VTAM 106 to send to the secondary (FIG. 3). Sending this information packet to the secondary is illustrated by (4) in FIG. 2.

The DASD subsystem 14 performing the DASD data write completes its data write operation and signals write complete to the requesting system (3). (If this is the end of the host channel program, the write complete will be posted to the requesting program; otherwise the channel interprets the signal to continue the channel program with the next operation.)

As a separate operation asynchronous to the original write operation, a data mover 104 will read changed data from the DASD subsystem, using the DASD address information from the DASD-provided information packet described above (5). The data mover 104 in turn will add the data together with its sequence information packet to the next message to be sent to the secondary data mover 108 (6). (There may be multiple data mover 104 and 108 processes to accommodate the write traffic.)

Once duplexing sessions have been established, the secondary receives notification of pending writes and the updated write data for DASD it is maintaining in duplex copy. VTAM 106 receives the messages from the primary and passes them to the secondary data mover 108. Each of these messages contains three content segments, built by the primary data mover 104 and interpreted by the secondary data mover 108. The three segments of each message are referred to as M0, M1, and M2 (FIG. 3).

M0 is a data-mover-to-data-mover header that serves to maintain logical continuity of the message stream and identifies the message content. Message content may include information packet-data transmission (M1–M2), establish or terminate duplex session, initialize secondary copy, communicate logical acknowledge signals from secondary to primary, and for exception notification and recovery actions.

M1 contains the set of information packets assigned by the primary data mover 104 since the preceding message. These represent write operations in progress for which data is not at the secondary.

M2 contains a set of fields, with each field containing a information packet plus the write (update) data associated with that information packet.

Each information packet contains sufficient information for the secondary data mover 108 to be able to determine what physical DASD records are to be updated, and to order these writes in the same sequence that the sequence information packets were assigned (which is, within a small degree of uncertainty, the same sequence that they will have been written on the primary DASD). The secondary data mover 108 first sees each information packet as it is received in the M1 message segment. The data mover 108 uses these information packets to maintain a pending write queue. As data for each information packet is received in M2 segments, it is matched with its information packet in the pending write queue (FIG. 3).

The secondary data mover 108 schedules I/O writes to the secondary DASD in the sequence of its pending write queue entries. Data for a given queue entry is not scheduled for write (7 in FIG. 2) until queue elements ahead of it have been scheduled for writing to DASD. Data arrives in M2 message segments as a function of when it was provided by the primary data mover 108. These updates are likely not to be in strict update sequence. Thus at any given time of activity, the pending write queue may have a sequence of complete entries—information packets plus associated write data, 'incomplete' information packets—without write data, followed by more complete information packets and incomplete information packets.

In one of this information packet synchronous with host write mode embodiment, the sending of the information packet by the control unit must be performed by different internal storage path (SP), not the SP that is processing the write operation that the information packet is registering. In an ideal situation, the time to acquire a storage path, connect (or reconnect) to a channel to the global sequencer (hereinafter referred to as sequencer), and send the information packet would be completely overlapped by the data transfer of the write data. Any delay in getting a storage path or in connecting to the channel may cause the information packet send time to be greater than the write data transfer time, thus delaying the completion of the primary writer operation (adding to write response time).

In a copending U.S. patent application No. 07/992,219, an asynchronous copy operation method is provided that will allow DASD subsystem 14 to queue the information packet as a message to the sequencer without delaying the device end for the primary write operation and without compromising system-wide write operation sequence integrity that is essential for the secondary data to be usable in recovery. This method is a significant improvement over the conventional system disclosed in FIGS. 1 and 2.

Hence, in this system, to maintain sequence integrity with asynchronous information packet presentation, the sequencer periodically provides a sequence checkpoint. At this time, a set of information packets are grouped together and processed as a single sequence unit.

This sequence unit of the copending application will be interpreted and processed as though all or none of the writes in the group had occurred. It is also required that the DASD subsystems generate and maintain information packet sequence numbers and that they maintain a clock that can be precisely and accurately correlated in the sequencer systems's time of day clock.

The sequence number is required in addition to the time stamp to ensure that no information packets from a subsystem 14 are lost in transit. The system, on receiving information packets, will ensure that the sequence numbers from each subsystem 14 form an unbroken sequence. Subsystem 14 numbers are values such that the sequencer system can detect missing information packets. The sequence number field size must be of sufficient size that rollover to zero does not introduce ambiguities in sequence number interpretation.

The clock must be of sufficient resolution and be able to be correlated with clock values in all other subsystems that comprise a session such that a write operation in one subsystem 14(1) that was initiated by an application as a result of a successful write to another subsystem 14 (2) will always be seen by its time stamp to have been written in the proper sequence (1 later than 2). The clock can be derived from a variety of sources.

All information packets with a time stamp equal to or less than (earlier than) the checkpoint time stamp form the checkpoint group. (For the first checkpoint of a session, these will be all information packets from the beginning of the session up to the checkpoint time. For subsequent checkpoints, it will be all information packets from the previous checkpoint time to the present checkpoint time.)

The checkpoint group of information packets is then assigned a checkpoint sequence number and sent to the secondary process location, where all the data updates represented in the checkpoint group are treated as a single unit for sequence integrity (changed data for all the information packets must be received before any data for a information packet in the group is written to the secondary DASD copy).

Accordingly, this type of asynchronous remote copy system allows for a process that can request the remote copy service to communicate when specific data, and all data preceding it, have been secured at the remote copy site, without requiring the suspension and delay in the sending of other updated data to the remote copy site.

However, there may be some transactions that are so important that the transactions must be communicated before the total number of transactions within a sequence checkpoint are complete. For example, there may be a particular financial transaction within a stream of financial transactions that must be communicated to secondary site before the total stream is complete. A system in accordance with the above identified process would not adequately identify such a transaction without a disruption of the total transaction stream. While numerous instances can be found of token use in communication streams to initiate synchronization of events, paths, or states in such configurations as rings, loops or the like, such methods do not teach or suggest the non-disruptive preservation of attributes in communicated event streams which enable reliable recording at a remote site of an information history. To illustrate this problem further now refer to the following.

Figure 4:
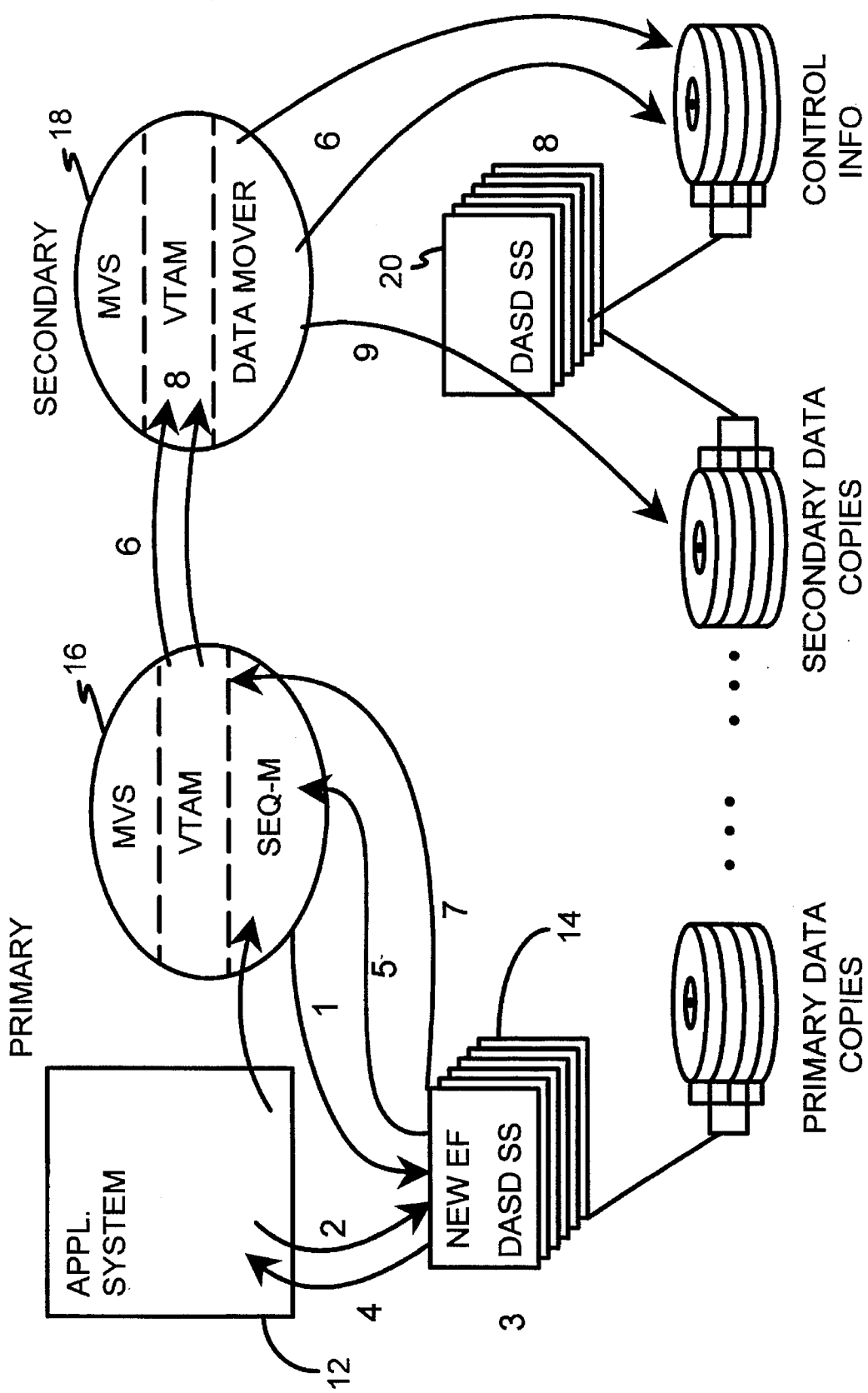
FIG. 4 illustrates an asynchronous copy operation of a conventional system.

FIG. 4 illustrates an asynchronous copy operation of a system in accordance with the above mentioned copending U.S. patent application No. 07/992,219. As is seen from the Figure:

1. An application system or process request that certain data sets or volumes be remotely duplexed. The Copy system software, labeled SEQ-M, instructs DASD subsystems 14 to monitor operations for data updates (write operations) into the storage areas.
2. The application 12 performs an I/O write to one of the storage areas being copied.
3. The DASD subsystem 14 recognizes that a write to a storage area to be copied is about to be performed. It creates a special purpose message including a message token to send to the copy system software.
4. The application's I/O write operation completes.
5. The message token is passed from the DASD subsystem 14 to the copy software, which arranges it in the correct sequence relative to other copy events in the system.
6. The DASD subsystem 14 then sends the token to the secondary (remote copy) location 18, where it is recorded in a control info log.
7. The updated data moves from the DASD subsystem 14 to the copy software.
8. The updated data is then sent on to the secondary system 18 to be coordinated with other copy data.
9. The updated data is then written to the secondary data copy DASD.

In another embodiment, the message token can be passed from DASD subsystem 14 to the copy software (step 5) at the same time as the updated data is passed from the DASD subsystem 14 to the copy software (step 7). That will allow the subsystem 14 to also send the message token and update to the secondary location 18 at the same time (steps 6 and 8).

As has been above mentioned, certain transactions are sufficiently important that the application process needs to ensure that data written in its I/O operation (2) above has actually been secured at the backup (secondary) location before other transactions in the event stream are completed. A system in accordance with the present invention accomplishes this objective without disrupting the overall flow of transactions within the system.

Figure 5:
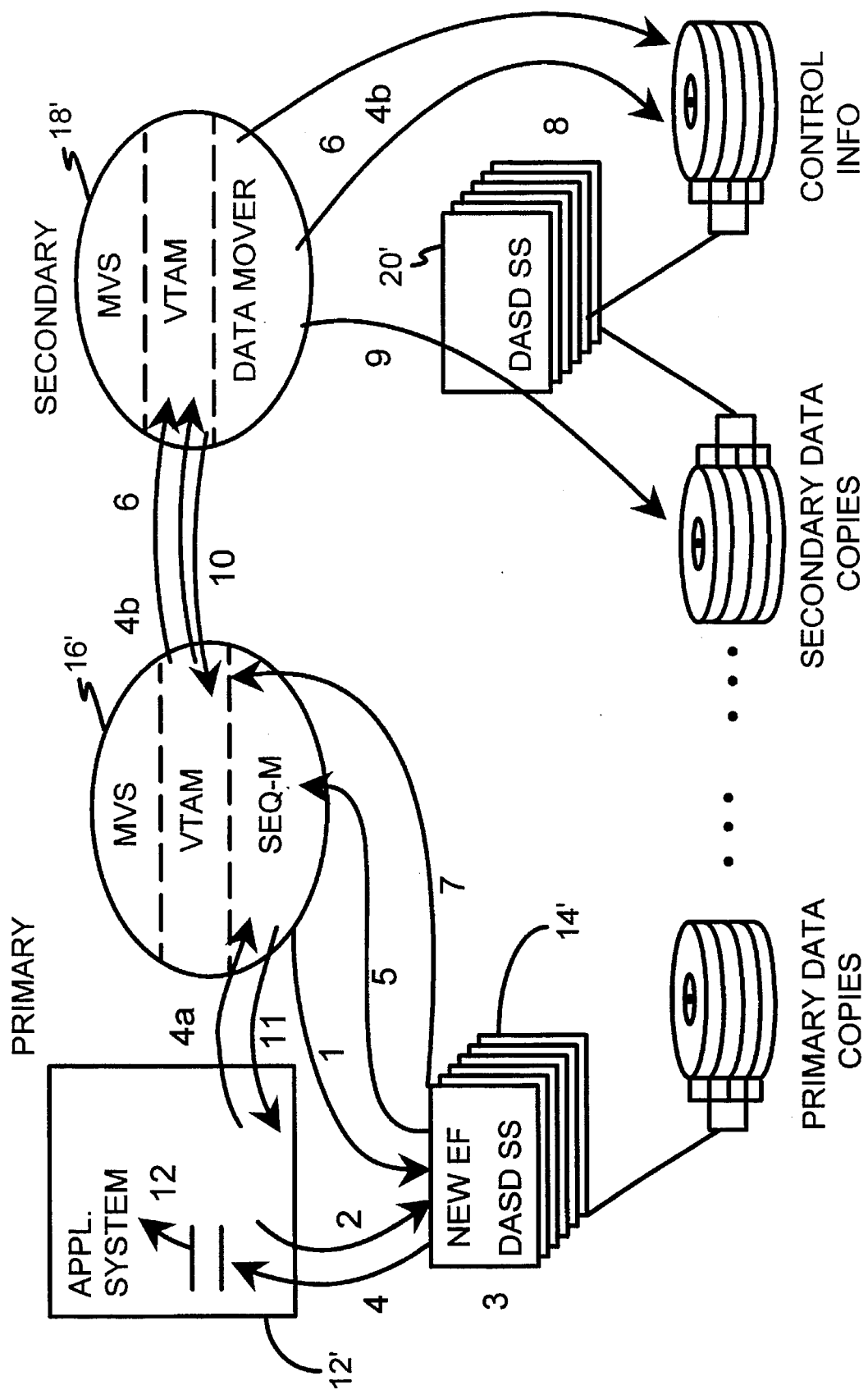
FIG. 5 is a diagram of the operation of a synchronizing marker system in accordance with the present invention.

To more particularly describe the advantages of the present invention refer now to FIGS. 5 and 6. FIG. 5 is a diagram of the operation of a synchronizing marker system in accordance with the present invention. FIG. 6 is an illustration of the pending write queue utilizing the synchronizing marker in accordance with the present invention. Referring now to FIGS. 5 and 6, and the following discussion, a method and a system in accordance with the present invention will be described hereinbelow. In such a system, refer now to FIG. 5:

Steps (2), (3) and (4) as described above in connection with FIG. 4 are utilized to write the data and create a write token as described above.

An application process 12', upon the completion of the local write operation (4), creates a marker request event, signals the copy process 16' with the marker request (4a), then waits for the copy process 16' to post this event as completed to be signalled later as indicated at 11.

The copy process 16' creates a marker message token, similar in form to message tokens that indicate a write to be copied, inserts it in the message stream and moves it to the secondary subsystem 18', where the message marker token is recorded in the control info log and pending write queue in the same manner as other message tokens (4b). (See token 126 in FIG. 6.)

When all data up to the point of the marker in the pending write queue ("A" in FIG. 6) has been secured, either in control info log (8) or on secondary copy DASD (9), the secondary copy process, identified as "Data Mover" in the figures, creates an acknowledgement message referencing the specific marker message token, and returns that message to the primary copy process 16'(10).

The primary copy process 16' now posts complete the pending marker operation of the application process 12' (11).

Figure 7:
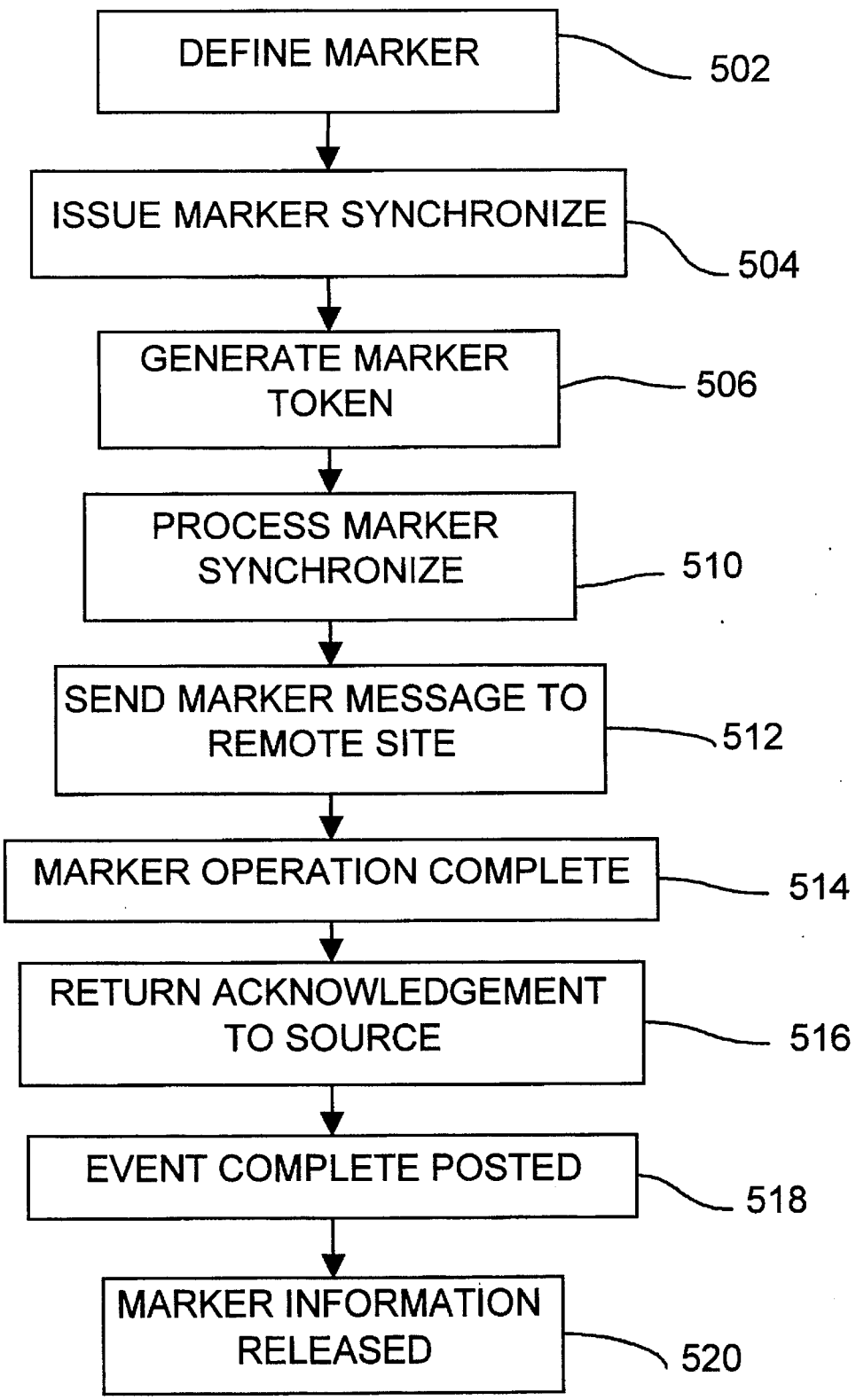
FIG. 7 is a flow chart showing the general operation of the remote dual copying in accordance with the present invention.

To more specifically describe the operation of the present invention, refer now to FIG. 7 which is a flow chart of this marker scheme. In such a system, a 'marker' function is defined in a global copy event token stream via step 502. A requestor, wishing to synchronize his/her process with the acknowledgement that write operations up to this point in time have been secured at a remote copy site, would issue a mark synchronize request to the remote copy site after the particular write I/O request that it is to be synchronized via step 504. The remote copy site will then generate a message marker token, which is similar to a write event token except that there is no corresponding update write data, via step 506.

When generated by the remote copy site, the message marker token, similar to a write event token, will necessarily have a later time stamp and higher global event sequence number than tokens for any preceding I/O write operation. The marker synchronize request also includes a control object upon which the requesting process utilizes to check for completion of the event.

The remote copy data mover will then process the marker request in the same manner as a write information packet via step 510. The marker synchronize request is then sent to the secondary subsystem where it will be sequenced in the pending write queue by its time stamp value and global sequence number via step 512. The marker synchronize request will cause no secondary DASD copy write. Rather, when the group that encompasses the marker synchronize request is complete and ready to be written to the secondary DASD subsystem, the secondary remote copy data mover will return an acknowledgement message to the primary subsystem that the marker operation is 'complete'—that the secondary subsystem had secured all the secondary write data that preceded the marker via step 514.

When the primary subsystem receives the marker-complete message from the secondary subsystem, the primary will post a "marker enqueue event complete" via step 516. The application process can then release the transaction to the outside or take such other action it desires via step 518, knowing that data needed for recovery has been secured at the remote site.

The preceding has been described in terms of two processing systems, one at a local or source site and the other at a remote site that contains the DASD copies. For some remote copy configurations, systems at both locations are not needed: The data mover (and sequencer) program at the local/primary and data mover program at the remote/secondary may operate in a single system. The only requirements for such operation are that the system running these programs be able to attach to the DASD subsystems at both the primary and secondary locations, which connection is quite within the capability of contemporary channels (e.g., IBM's ESCON channels, ANSI Fiber channel).

When the systems operate in a single system, the (VTAM) inter-system communications described take place via passing of message and data buffers through that system's memory. An alternate system for data mover program sequence marker processing in which no explicit marker message speeds to be exchanged between primary and secondary is described below. In this system, the remote copy system described may, as part of its normal operation, cause the secondary to send periodic and regular acknowledgement messages (ACKN) to the primary.

These ACKNs identify the event number (sequence or clock time) for data and messages received from the primary, with each ACKN informing the primary that all events up to and including the event number given have been secured at the secondary. Such a stream of ACKN messages from a communications recipient (secondary) to a sender (primary) is usual and conventional in asynchronous telecommunications protocols. These permit the sender to discard buffers that might have been needed for the resending of data and messages had they been lost in the transmission sequences.

When the remote data duplexing programs operate with an ACKN stream as described above, the process remote data copy process Synchronizing Marker of the present invention can be streamlined such that no explicit sync marker token/event communication is required between the primary and secondary data mover programs. Essentially, when a synchronizing event is called for by an application process, the primary data mover program creates its control object (as before) then monitors event number values returned in ACKN stream from the secondary. When an event number value in an ACKN is equal to or greater than the event number value of the synchronizing marker control object, the data mover program posts the control object 'complete' upon receiving the sync complete message from the secondary.

Utilizing the system above-described in FIG. 5, the marker synchronizing system utilizing a single processing system would be as follows:

Steps (2), (3), and (4) . . . as before.

Data is received from the subsystem (step <7> or token and data together in a combined steps <5> and <7>). This data is sent to the secondary (8) as previously described. At regular, frequent, periodic intervals when the secondary has secured the receiving data in its control log (8), it returns an ACKN message (10) for data time-event values up to the latest stored in the log.

One of the (2-3-4) write sequences is for a write on which the writing application wishes to synchronize its continuance—wait until the data written has been secured at the secondary before proceeding with its process or a subprocess. On seeing the completion of its application data write (4) it creates a marker request object to be posted by the data mover and calls the data mover with the marker request. The marker request includes a system's time value (either the time when (4) was seen or the current system time).

The primary data mover program adds a time-event value to the marker request object. This time-event value may be the system time value from the application request or an event number at the current point in the stream of remote copy events.

The primary data mover, as a normal part of its operations, evaluates ACKN messages as they are received from the secondary for actions to be taken as a function of event-time values returned in the ACKNs. (Some of these will cause the data mover to release retained resources that will no longer be needed for such actions as transmission error recovery.)

When the primary data mover receives an ACKN with a time-event value equal to or greater than the time-event value of a marker request object, it posts that marker request complete (11). (Note, there may be more than one marker event active.)

The application process recognizes the posting event (through usual and customary operating system notifications) and continues its deferred processing (12).

Accordingly, the present invention provides for event synchronization in asynchronous remote data duplexing, the synchronization being non-disruptive to application execution at a host CPU and to data copying at a remote site. The event sequence is characterized by embedding monotonically labeled or sequentially numbered labeled tokens of write operations including addresses and periodic checkpoint lists thereby establishing a total ordering. Event synchronization is achieved by embedding at the host a synch request having a higher sequence number than that of some prior predetermined event and generating a responsive synch reply from the remote site to the host.

A key element of the present invention is that the asynchronous data update stream to the secondary subsystem is not interrupted or otherwise distorted by sync event waits, and no primary I/O writes are delayed by the DASD copy system. Movement of the data to the secondary subsystem continues without interruption; with only the addition of marker messages and their processing.

A specific application of the present invention has found use in information management system (IMS) transaction processing. In IMS processing, the marker event would typically be needed following the writing of essential commit data to IMS's write ahead data set (WADS) log and before IMS has completed its total commit request. IMS's WADS DASD is among the most heavily used and response time sensitive data sets in the IMS system. Accordingly, by utilizing a system and method in accordance with the present invention an essential transaction can be obtained before the total transaction stream is completed. The alternative of writing synchronous I/O of the WADS log to a remote copy site would degrade transaction performance to an unacceptable level in most, if not all, IMS processes.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for assuring the occurrence of an event at a site remote from a source of asynchronous sequence of write operations, the asynchronous sequence of write operations including a sequential number of special purpose messages, each special purpose message including a numerically ordered token that is in an ordered event sequence, the method comprising the steps of:

(a) providing in the asynchronous sequence of write operations at the source a marker request which includes a token with an event value exceeding in magnitude an event value of a previous token;

(b) transmitting the asynchronous sequence of write operations with the marker request to the remote site; and (c) sending a reply from the remote site to the source after the marker request is received at the remote site, the reply indicating that the event at the remote site is complete.

2. The method of claim 1 in which the event value of the token and previous token is selected from a set consisting of a time stamp and a sequential number.

3. The method of claim 1 in which step (a) comprises the steps of:

(a1) issuing a marker synchronize request from the source;

(a2) generating a marker token at the remote site responsive to the marker synchronize request; and (a3) processing the marker synchronize request at the remote site.

4. The method of claim 3 in which step (c) comprises the steps of:

(c1) placing the marker request sequentially in a write operation storage area;

(c2) returning an event complete message to the source; and (c3) posting the event complete message at the source.

5. The method of claim 4 which further comprises the step of releasing information as a result of the event complete message to a site outside of the source and the remote site.

6. The method of claim 5 in which the marker request does not update any write operation.

7. A system for assuring the occurrence of an event at a site remote from a source of asynchronous sequence of write operations, the asynchronous sequence of write operations including a sequential number of special purpose messages, each special purpose message including a numerically ordered token that is in an ordered event sequence, the system comprising:

means for providing in the asynchronous sequence of write operations at the source a marker request which includes a token with an event value exceeding in magnitude an event value of a previous token;

means responsive to the marker request providing means for transmitting the asynchronous sequence of write operations with the marker request to the remote site; and means responsive to the transmitting means for sending a reply from the remote site to the source after the marker request is received at the remote site, the reply indicating that the event at the remote site is complete.

8. The system of claim 7 in which the event value of the token and previous token is selected from a set consisting of a time stamp and a sequential number.

9. The system of claim 7 in which the marker request providing means comprises:

means for issuing a marker synchronize request from the source;

means responsive to the issuing means for generating a marker token at the remote site responsive to the marker synchronize request; and means responsive to the generating means for processing the marker synchronize request at the remote site.

10. The system of claim 9 in which sending means comprises:

means responsive to the transmitting means for placing the marker request sequentially in a write operation storage area;

means responsive to the marker request placing means for returning an event complete message to the source; and means responsive to the returning means for posting the event complete message to the source.

11. The system of claim 10 which further comprises means responsive to the posting means for releasing information, as a result of the event complete message to a site outside of the source and the remote site.

12. The system of claim 11 in which the marker request does not update any write operation.

13. A method for assuring the occurrence of an event at a site remote from a source of asynchronous independently generated sequence of application dependent write operations, embedding in the sequence at the source labeled tokens counterpart to write operations including addresses and periodic checkpoint lists establishing thereby a totally ordered event sequence, comprising the steps of:

(a) embedding in the sequence of application dependent write operations at the source a synchronization request with a labeled token of an embedded predetermined event exceeding in magnitude a labeled token of a previously embedded predetermined event and transmitting the sequence of application dependent write operations with the embedded synchronization request to the remote site; and (b) responsive to receipt of the synchronization request at the remote site, sending a coded reply from the remote site to the sequence source within a given time period or otherwise treating the remote predetermined event as not having been received at the site.

14. A system for assuring the occurrence of an event at a site remote from a source of asynchronous independently generated sequence of application dependent write operations, embedding in the sequence at the source labeled tokens counterpart to write operations including addresses and periodic checkpoint lists establishing thereby a totally ordered event sequence, comprising:

means for embedding in the sequence of application dependent write operations at the source a synchronization request with a labeled token of an embedded predetermined event exceeding in magnitude a labeled token of a previously embedded predetermined event and transmitting the sequence of application dependent write operations with the embedded synchronization request to the remote site; and means responsive to receipt of the embedded synchronization request at the remote site for sending a coded reply from the remote site to the source within a given time period or otherwise treating the embedded predetermined event as not having been received at the remote site.

15. In a system in which asynchronously and independently executing applications on at least one processor at a primary site create a sequence of write operations against a local store coupling the processor at the primary site and updates copied from the local store to storage located within at least one remote processing site, which sequence of write operations are both enqueued and executed at different rates at the primary site resulting in a near random ordered copy sequence as applied to the remote site, embedding in the sequence of write operations at the primary site labeled tokens counterpart to the write operations including addresses and periodic checkpoint lists establishing thereby a totally ordered event sequence, a method for securing confirmation of a recording of a predetermined one of the application dependent write operations at the remote site, comprising the steps of:

(a) embedding in the sequence of write operations at the primary site a synchronization request with a labeled token of an embedded predetermined event exceeding in magnitude a labeled token of a previously embedded predetermined event and transmitting the sequence of write operations with the embedded synchronization request to the remote site; and (b) responsive to receipt of the synchronization request at the remote site, sending a coded reply from the remote site to the primary site within a given time period or otherwise treating the embedded predetermined event as not having been received at the remote site.

16. In a system in which asynchronously and independently executing applications on at least one processor at a primary site create a sequence of write operations against a local store coupling the processor at the primary site and updates copied from the local store to storage located within at least one remote processing site, which sequence of write operations are both enqueued and executed at different rates at the primary site resulting in a near random ordered copy sequence as applied to the remote site, embedding in the sequence of write operations at the primary site monotonically labeled tokens counterpart to the write operations including addresses and periodic checkpoint lists establishing thereby a totally ordered event sequence, a system for securing confirmation of a recording of a predetermined one of the application dependent write operations at the remote site, the system comprising:

means for embedding in the sequence of write operations at the primary site a synchronization request with a labeled token of an embedded predetermined event exceeding in magnitude a labeled token of a previously embedded predetermined event and transmitting the sequence of write operations with the embedded synchronization request to the remote site; and means responsive to receipt of the synchronization request at the remote site for sending a coded reply from the remote site to the primary site within a given time period or otherwise treating the embedded predetermined event as not having been received at the remote site.

17. A method for assuring the occurrence of an event at a site remote from a source of asynchronous sequence of write operations, the asynchronous sequence of write operations including a sequential number of special purpose messages, each special purpose message including a numerically ordered token that provides an ordered event sequence, the method comprising the steps of:

(a) providing in the asynchronous sequence of write operations at the source a marker request which includes a token with an event value exceeding in magnitude an event value of a previous token; and (b) recognizing an acknowledgement from the remote site, the acknowledgement indicating that the event at the remote site is complete.

18. The method of claim 17 in which the event value of the token and previous token is selected from a set consisting of a time stamp and a sequential number.

19. The method of claim 17 in which step (a) comprises the steps of:

(a1) issuing a marker synchronize request from the source;

(a2) receiving the acknowledgement from the remote site; and (a3) processing the marker synchronize request at the source.

20. The method of claim 19 in which step (c) comprises the steps of:

(c1) placing the marker request sequentially in a write operation storage area within the source;

(c2) returning an event complete message to the source; and (c3) posting the event complete message at the source.

21. The method of claim 20 which further comprises the step of releasing information as a result of the event complete message to a site outside of the source and the remote site.

22. The method of claim 21 in which the marker request does not update any write operation.

23. A system for assuring the occurrence of an event at a site remote from a source of asynchronous sequence of write operations, the asynchronous sequence of write operations including a sequential number of special purpose messages, each special purpose message including a numerically ordered token that provides an ordered event sequence, the system comprising:

means for providing in the asynchronous sequence of write operations at the source a marker request which includes a token with an event value exceeding in magnitude an event value of a previous token; and means responsive to marker request providing means for recognizing an acknowledgement from the remote site, the acknowledgement indicating that the event at the remote site is complete.

24. The system of claim 23 in which the event value of the token and previous token is selected from a set consisting of a time stamp and a sequential number.

25. The system of claim 23 in which the marker request providing means comprises:

means for issuing a marker synchronize request from the source;

means responsive to the issuing means for providing the acknowledgment from the remote site; and means responsive to the issuing means for processing the marker synchronize request at the source.

26. The system of claim 25 in which the issuing means comprises:

means responsive to the providing means for placing the marker request sequentially in a write operation storage area;

means responsive to the marker request placing means for returning an event complete message to the source; and means responsive to the returning means for posting the event complete message to the source.

27. The system of claim 26 which further comprises means responsive to the posting means for releasing information as a result of the event complete message to a site outside of the source and the remote site.

28. The system of claim 27 in which the marker request does not update any write operation.

29. A computer readable medium containing program instructions for assuring the occurrence of an event at a site remote from a source of asynchronous sequence of write operations, the asynchronous sequence of write operations including a sequential number of special purpose messages, each special purpose message including a numerically ordered token that is an ordered event sequence, the program instructions comprising:

providing a marker request with an event value exceeding in magnitude a previously predetermined event value in the sequence at the source;

transmitting the sequence with the marker request to the remote site; and sending a reply indicating that the event is complete to the source from the remote site after the marker request is received at the remote site.

* * * * *

UNITED STATES PATENT AND TRADEMARK OFFICE
CERTIFICATE OF CORRECTION

PATENT NO. : 5,623,599
DATED : Apr 22, 1997
INVENTOR(S) : Robert W. Shomler

It is certified that error appears in the above-indentified patent and that said Letters Patent is hereby corrected as shown below:

Column 10, line 33 delete "speeds" and insert --needs--

Column 13, line 50 delete "sequence"

Column 13, line 52 after "the", insert --remote--

Column 13, line 51, after "the" delete --remote --.

Signed and Sealed this

Ninth Day of December, 1997

*Attest:*

BRUCE LEHMAN

*Attesting Officer*     *Commissioner of Patents and Trademarks*